United States Patent
Chisenga et al.

(10) Patent No.: US 9,270,191 B2
(45) Date of Patent: Feb. 23, 2016

(54) POWER CONDITION UNITS WITH MPPT

(71) Applicant: SolarCity Corporation, San Mateo, CA (US)

(72) Inventors: Lesley Chisenga, Redwood Shores, CA (US); Gehan Anil Joseph Amaratunga, Cambridge (GB); Cuauhtemoc Rodriguez, Cambridge (GB)

(73) Assignee: SOLARCITY CORPORATION, San Mateo, CA (US)

( * ) Notice: Subject to any disclaimer, the term of this patent is extended or adjusted under 35 U.S.C. 154(b) by 0 days.

(21) Appl. No.: 13/843,772

(22) Filed: Mar. 15, 2013

(65) Prior Publication Data

US 2013/0279210 A1    Oct. 24, 2013

Related U.S. Application Data

(63) Continuation of application No. 12/789,154, filed on May 27, 2010, now Pat. No. 8,405,367, which is a continuation-in-part of application No. 12/160,743, filed as application No. PCT/GB2007/050014 on Jan. 12, 2007, now Pat. No. 8,089,785.

(30) Foreign Application Priority Data

Jan. 13, 2006 (GB) .................................. 0600658.9
Mar. 19, 2010 (GB) .................................. 1004621.7

(51) Int. Cl.
*H02M 3/156* (2006.01)
*H02M 5/45* (2006.01)
(Continued)

(52) U.S. Cl.
CPC ................. *H02M 5/45* (2013.01); *H02J 3/383* (2013.01); *H02J 3/385* (2013.01); *H02M 7/4807* (2013.01); *H02M 2001/007* (2013.01); *Y02E 10/563* (2013.01); *Y02E 10/58* (2013.01)

(58) Field of Classification Search
CPC . H02M 5/45; H02M 2001/007; H02M 7/003; H02M 7/537; H02J 3/383; Y02E 10/563
USPC .................... 363/24, 37, 40, 41, 95, 131, 132
See application file for complete search history.

(56) References Cited

U.S. PATENT DOCUMENTS 2,852,721 A    9/1958 Harders et al.
4,479,175 A   10/1984 Gille et al.
(Continued)

FOREIGN PATENT DOCUMENTS

DE     10064039    12/2001
EP      0340006    11/1989
(Continued)

OTHER PUBLICATIONS

Portions of prosecution history of U.S. Appl. No. 12/160,743, Sep. 14, 2011, Rodriguez, Cuauhtemoc.
(Continued)

*Primary Examiner* — Adolf Berhane
*Assistant Examiner* — Yemane Mehari
(74) *Attorney, Agent, or Firm* — Adeli LLP

(57) ABSTRACT

A power conditioning unit with maximum power point tracking (MPPT) for a dc power source in a photovoltaic panel is provided. The power conditioning unit includes a power injection control block having a sense input coupled to an energy storage capacitor on a dc link for controlling a dc-to-ac converter to control the injected mains power. The power injection control block tracks the maximum power point by measuring a signal on the dc link which depends on the power drawn from the dc power source, and thus there is no need to measure the dc voltage and current from the dc source. The measured signal is a ripple voltage level and the power injection control block controls the amplitude of an ac current output such that the amount of power transferred to the grid mains is dependent on the amplitude of a sinusoidal voltage component on the energy storage capacitor.

9 Claims, 13 Drawing Sheets

(51) Int. Cl.
*H02J 3/38* (2006.01)
*H02M 7/48* (2007.01)
*H02M 1/00* (2007.01)

(56) References Cited

U.S. PATENT DOCUMENTS

| | | | |
|---|---|---|---|
| 4,626,983 | A | 12/1986 | Harada et al. |
| 4,772,994 | A | 9/1988 | Harada et al. |
| 5,268,832 | A | 12/1993 | Kandatsu |
| 5,329,222 | A | 7/1994 | Gyugyi et al. |
| 5,381,327 | A | 1/1995 | Yan |
| 5,404,059 | A | 4/1995 | Löffler |
| 5,576,941 | A | 11/1996 | Nguyen et al. |
| 5,585,749 | A | 12/1996 | Pace et al. |
| 5,814,970 | A | 9/1998 | Schmidt |
| 5,930,131 | A | 7/1999 | Feng |
| 6,021,052 | A | 2/2000 | Unger et al. |
| 6,058,035 | A | 5/2000 | Madenokouji et al. |
| 6,081,104 | A | 6/2000 | Kern |
| 6,219,623 | B1 | 4/2001 | Wills |
| 6,281,485 | B1 | 8/2001 | Siri |
| 6,339,538 | B1 | 1/2002 | Handleman |
| 6,369,461 | B1 | 4/2002 | Jungreis et al. |
| 6,445,599 | B1 | 9/2002 | Nguyen |
| 6,657,419 | B2 | 12/2003 | Renyolds |
| 6,678,174 | B2 | 1/2004 | Suzui et al. |
| 6,856,102 | B1 | 2/2005 | Lin et al. |
| 6,888,728 | B2 | 5/2005 | Takagi et al. |
| 6,950,323 | B2 | 9/2005 | Achleitner et al. |
| 6,980,783 | B2 | 12/2005 | Liu et al. |
| 7,031,176 | B2 | 4/2006 | Kotsopoulos et al. |
| 7,064,967 | B2 | 6/2006 | Ichinose et al. |
| 7,078,883 | B2 | 7/2006 | Chapman et al. |
| 7,099,169 | B2 | 8/2006 | West et al. |
| 7,193,872 | B2 * | 3/2007 | Siri ............................. 363/95 |
| 7,248,946 | B2 * | 7/2007 | Bashaw et al. ............ 700/286 |
| 7,262,979 | B2 | 8/2007 | Wai et al. |
| 7,319,313 | B2 | 1/2008 | Dickerson et al. |
| 7,324,361 | B2 | 1/2008 | Siri |
| 7,339,287 | B2 | 3/2008 | Jepsen et al. |
| 7,414,870 | B2 | 8/2008 | Röttger et al. |
| 7,432,691 | B2 | 10/2008 | Cutler |
| 7,450,401 | B2 | 11/2008 | Lida |
| 7,463,500 | B2 | 12/2008 | West |
| 7,466,566 | B2 | 12/2008 | Fukumoto |
| 7,479,774 | B2 | 1/2009 | Wai et al. |
| 7,626,834 | B2 | 12/2009 | Chisenga et al. |
| 7,885,085 | B2 | 2/2011 | Orr et al. |
| 7,906,870 | B2 | 3/2011 | Ohn |
| 7,919,753 | B2 | 4/2011 | Shelley et al. |
| 8,067,855 | B2 | 11/2011 | Mumtaz et al. |
| 8,089,785 | B2 | 1/2012 | Rodriguez |
| 8,139,382 | B2 | 3/2012 | Zhang et al. |
| 8,184,460 | B2 | 5/2012 | O-Brien et al. |
| 8,405,367 | B2 | 3/2013 | Chisenga et al. |
| 8,410,889 | B2 | 4/2013 | Garrity et al. |
| 8,461,809 | B2 | 6/2013 | Rodriguez |
| 2001/0023703 | A1 | 9/2001 | Kondo et al. |
| 2002/0034083 | A1 | 3/2002 | Ayyanar et al. |
| 2002/0085397 | A1 | 7/2002 | Suzui et al. |
| 2002/0118559 | A1 | 8/2002 | Kurokami et al. |
| 2002/0177401 | A1 | 11/2002 | Judd et al. |
| 2003/0066555 | A1 | 4/2003 | Hui et al. |
| 2003/0193821 | A1 | 10/2003 | Krieger et al. |
| 2004/0076028 | A1 | 4/2004 | Achleitner et al. |
| 2004/0117676 | A1 | 6/2004 | Kobayashi et al. |
| 2004/0165408 | A1 | 8/2004 | West et al. |
| 2004/0207366 | A1 | 10/2004 | Sung |
| 2004/0233685 | A1 | 11/2004 | Matsuo et al. |
| 2005/0030772 | A1 | 2/2005 | Phadke |
| 2005/0068012 | A1 | 3/2005 | Cutler |
| 2005/0242795 | A1 | 11/2005 | Al-Kuran et al. |
| 2006/0232220 | A1 | 10/2006 | Melis |
| 2007/0035975 | A1 | 2/2007 | Dickerson et al. |
| 2007/0133241 | A1 * | 6/2007 | Mumtaz et al. ............ 363/131 |
| 2007/0158185 | A1 | 7/2007 | Andelman et al. |
| 2007/0290656 | A1 | 12/2007 | Keung |
| 2008/0055941 | A1 | 3/2008 | Victor et al. |
| 2008/0097655 | A1 | 4/2008 | Hadar |
| 2008/0205096 | A1 | 8/2008 | Lai et al. |
| 2008/0266919 | A1 | 10/2008 | Mallwitz |
| 2008/0285317 | A1 | 11/2008 | Rotzoll |
| 2008/0291707 | A1 | 11/2008 | Fang |
| 2008/0304296 | A1 | 12/2008 | Nadimpalliraju et al. |
| 2008/0304298 | A1 | 12/2008 | Toba et al. |
| 2009/0080226 | A1 | 3/2009 | Fornage |
| 2009/0097283 | A1 | 4/2009 | Krein et al. |
| 2010/0002470 | A1 | 1/2010 | Kiamilev et al. |
| 2010/0052425 | A1 | 3/2010 | Moore et al. |
| 2010/0195361 | A1 | 8/2010 | Stem |
| 2010/0207455 | A1 | 8/2010 | Erickson, Jr. et al. |
| 2010/0246230 | A1 | 9/2010 | Porter et al. |
| 2010/0309695 | A1 | 12/2010 | Fornage |
| 2011/0210694 | A1 | 9/2011 | Uehashi et al. |
| 2012/0033463 | A1 | 2/2012 | Rodriguez |
| 2012/0081937 | A1 | 4/2012 | Phadke |

FOREIGN PATENT DOCUMENTS

| | | |
|---|---|---|
| EP | 0628901 | 12/1994 |
| EP | 0780750 | 6/1997 |
| EP | 0947905 | 10/1999 |
| EP | 1235339 | 8/2002 |
| EP | 1239576 | 9/2002 |
| EP | 1974453 | 10/2008 |
| EP | 2548279 | 1/2013 |
| GB | 2415841 | 1/2006 |
| GB | 2419968 | 5/2006 |
| GB | 2434490 | 4/2009 |
| GB | 2454389 | 8/2009 |
| GB | 2478789 | 3/2012 |
| GB | 2482653 | 8/2012 |
| JP | 05003678 | 1/1993 |
| JP | 07-028538 | 1/1995 |
| JP | 08-227324 | 9/1996 |
| JP | 08-317664 | 11/1996 |
| JP | 10-174452 | 6/1998 |
| JP | 2000-020150 | 1/2000 |
| JP | 2000-316282 | 11/2000 |
| JP | 2000-347753 | 12/2000 |
| JP | 2001-178145 | 6/2001 |
| JP | 2002-238246 | 8/2002 |
| JP | 2002-270876 | 9/2002 |
| JP | 2002-354677 | 12/2002 |
| WO | WO 96/07130 | 3/1996 |
| WO | WO 2004/001942 | 12/2003 |
| WO | WO 2004/006342 | 1/2004 |
| WO | WO 2004/008619 | 1/2004 |
| WO | WO 2004/100348 | 11/2004 |
| WO | WO 2005/015584 | 2/2005 |
| WO | WO 2006/011071 | 2/2006 |
| WO | WO 2006/048688 | 5/2006 |
| WO | WO 2007/080429 | 7/2007 |
| WO | WO 2007/111868 | 10/2007 |
| WO | WO 2008/092055 | 7/2008 |
| WO | WO 2009/051853 | 4/2009 |
| WO | WO 2009/134756 | 11/2009 |
| WO | WO 2011/114161 | 9/2011 |

OTHER PUBLICATIONS

Portions of prosecution history of U.S. Appl. No. 12/789,154, Feb. 8, 2013, Chinsenga, Lesley, et al.

Portions of prosecution history of U.S. Appl. No. 13/276,849, Feb. 11, 2013, Rodriguez, Cuauhtemoc.

Portions of prosecution history of U.S. Appl. No. 13/276,885, Aug. 27, 2013, Rodriguez, Cuauhtemoc.

Portions of prosecution history of EP20110710023, Feb. 5, 2009 (mailing date), Enecsys Limited.

Portions of prosecution history of GB 0600658, Feb. 5, 2009 (mailing date), Enecsys Limited.

Portions of prosecution history of GB 0901815, Feb. 24, 2009 (mailing date), Enecsys Limited.

(56) References Cited

OTHER PUBLICATIONS

Portions of prosecution history of GB 1004621, Jan. 24, 2012 (mailing date), Enecsys Limited.
Search Report for GB 1009430, Dec. 9, 2010 (date of search), Enecsys Limited.
International Search Report for PCT/GB2007/050014, Jan. 15, 2008 (date of completion), Enecsys Limited.
International Preliminary Report on Patentability of PCT/GB2007/050014, Jul. 15, 2008 (issuance date), Enecsys Limited.
International Search Report and Written Opinion of PCT/GB2011/050529, Oct. 17, 2012 (mailing date), Enecsys Limited.
International Preliminary Report on Patentability of PCT/GB2011/050529, Nov. 15, 2012 (mailing date), Enecsys Limited.
Author Unknown, "DC Combiner Box Enables Better Awareness for Active Management," SolarMagic DC Monitoring Combiner Box Specifications, Apr. 2011, 2 pages, National Semiconductor Corporation.
Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.
Calais, Martina, et al., "Inverters for Single-Phase Grid Connected Photovoltaic Systems—Overview and Prospects," Proceedings of the $17^{th}$ European Photovoltaic Solar Energy Conference, Oct. 22-26, 2001, pp. 437-440, Munich, Germany.
Kikuchi, Naoto, et al., "Single Phase Amplitude Modulation Inverter for utility Interactive Photovoltaic System," IECON '99 Proceedings, Nov. 29-Dec. 3, 1999, pp. 385-389, IEEE.
Kimball, Jonathan W. et al., "Analysis and Design of Switched Capacitor Converters"; Grainger Center for Electric Machinery and Electro mechanics, University of Illinois at Urbana-Champaign, Urbana, IL, USA, pp. 1473-1477, IEEE.
Kjaer, Soeren Baekhoej, et al., "Design Optimization of a Single Phase Inverter for Photovoltaic Applications," IEEE $34^{th}$ Annual Power Electronics Specialist Conference, Jun. 15-19, 2003, pp. 1183-1190, vol. 3, IEEE.
Kotsopoulos, Andrew, et al., "Predictive DC Voltage Control of Single-Phase PV Inverters with Small DC Link Capacitance," IEEE International Symposium, Month Unknown, 2003, pp. 793-797.

Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.
Krein, Philip T., et al., "Cost-Effective Hundred Year Life for Single-Phase Inverters and Rectifiers in Solar and LED Lighting Applications Based on Minimum Capacitance Requirements and a Ripple Power Port," Applied Power Electronics Conference and Exposition, Feb. 15-19, 2009, pp. 620-625.
Marra, Enes Gonçalves et al., "Self-Excited Induction Generator Controlled by a VS-PWM Converter Providing High Power-Factor Current to A Single-Phase Grid," Proceedings of the $24^{th}$ Annual Conference of IEEE, Aug. 31-Sep. 4, 1998, pp. 703-708, vol. 2, IEEE.
Martins, Denizar Cruz, et al., "Interconnection of a Photovoltaic Panels Array to a Single-Phase Utility Line from a Static Conversion System," Power Electronics Specialists Conference, Jun. 2000, IEEE 31st Annual, pp. 1207-1211, vol. 3.
Mumtaz, Asim, et al., "Grid Connected PV Inverter Using a Commercially Available Power IC," PV in Europe Conference, Oct. 2002, 3 pages, Rome, Italy.
Rodriguez, Cuauhtemoc, et al., "Long-Lifetime Power Inverter for Photovoltaic AC Modules," IEEE Transactions of Industrial Electronics, Jul. 2008, pp. 2593-2601, vol. 55, No. 7, IEEE.
Shimizu, Toshihisa, et al., "A Flyback-type Single Phase Utility Interactive Inverter with Low-frequency Ripple Current Reduction on the DC Input for an AC Photovoltaic Module System," IEEE $33^{rd}$ Annual Power Electronics Specialist Conference, Month Unknown, 2002, pp. 1483-1488, vol. 3, IEEE.
Sun, Xiaofeng, et al., "A Research on Photovoltaic Energy Controlling System with Maximum Power Point Tracking," Proceedings of the Power Conversion Conference—Osaka, Apr. 2-5, 2002, pp. 822-826, vol. 2, IEEE.
Yatsuki, Satoshi, et al., "A Novel AC Photovoltaic Module System based on the Impedance-Admittance Conversion Theory," IEEE $32^{nd}$ Annual Power Electronics Specialists Conference, Month Unknown, 2001, pp. 2191-2196, vol. 4, IEEE.
International Search Report and Written Opinion of PCT/GB2005/050197, Feb. 14, 2006 (mailing date), Enecsys Limited.
International Preliminary Report on Patentability of PCT/GB2005/050197, May 8, 2007 (issuance date), Enecsys Limited.

\* cited by examiner

POWER CONDITION UNITS WITH MPPT

CLAIM OF BENEFIT TO PRIOR APPLICATIONS

This application is a continuation application of U.S. patent application Ser. No. 12/789,154, filed May 27, 2010, now issued as U.S. Pat. No. 8,405,367. U.S. patent application Ser. No. 12/789,154 is a continuation-in-part application of U.S. patent application Ser. No. 12/160,743, filed May 4, 2010, now issued as U.S. Pat. No. 8,089,785. U.S. patent application Ser. No. 12/160,743 is a national stage application of International Patent Application PCT/GB2007/050014, filed Jan. 12, 2007, now published as WO 2007/080429. International Patent Application PCT/GB2007/050014 and U.S. patent application Ser. No. 12/160,743 claim the benefit of United Kingdom Patent Application GB 0600658.9, filed Jan. 13, 2006, now published as GB2434490. U.S. patent application Ser. No. 12/789,154 claims the benefit of United Kingdom Patent Application GB 1004621.7, filed Mar. 19, 2010, now published as United Kingdom Patent Publication GB2478789. U.S. patent application Ser. No. 12/789,154, now issued as U.S. Pat. No. 8,405,367 is incorporated herein by reference.

FIELD OF THE INVENTION

This invention relates to power conditioning units for delivering power from a dc power source to an ac output, either for connecting directly to the mains (grid) utility supply or for powering mains (grid) devices directly, independent from the mains utility supply. More particularly the invention relates to methods and apparatus for Maximum Power Point Tracking (MPPT) for such power conditioning units, in particular for photovoltaic panels.

BACKGROUND TO THE INVENTION

We have previously described (see above) improved techniques for energy control in power conditioning units (inverters). In particular these techniques enable the construction of a dc-to-mains power converter which does not need to use electrolytic capacitors, which are prone to failure, especially at high temperatures as encountered, for example, behind a solar PV (photovoltaic) panel.

BACKGROUND PRIOR ART CAN BE FOUND IN

EP 0780750A; JP 2000020150A; US 2005/0068012; JP 05003678A; GB2415841A; EP0947905A; WO2006/011071; EP1,235,339A; WO2004/006342; DE 100 64 039 A; US2005/030772; WO96/07130; U.S. Pat. No. 6,657,419; US2004/117676; US2006/232220; WO2004/001942; GB2419968A; U.S. Pat. No. 7,319,313; U.S. Pat. No. 7,450,401; U.S. Pat. No. 7,414,870; U.S. Pat. No. 7,064,967; "Cost-Effective Hundred-Year Life for Single-Phase Inverters and Rectifiers in Solar and LED Lighting Applications Based on Minimum Capacitance Requirements and a Ripple Power Port", P. T. Kerin and R. S. Balog—technical paper; US2009/0097283; "Long-Lifetime Power Inverter for Photovoltaic AC Modules", C. Rodriguez and G. A. J. Amaratunga, IEEE Trans IE, 55(7), 2008, p 2593; US2008/097655.

We will now describe some improved techniques for maximum power point tracking, which are particularly suitable for use with power conditioning units of the types we have previously described.

SUMMARY OF THE INVENTION

According to a first aspect of the invention there is therefore provided a power conditioning unit with maximum power point tracking (MPPT), for delivering power from a dc power source to an ac mains power supply output, the power conditioning unit comprising: an input for receiving power from said dc power source; an output for delivering ac power to said ac mains power supply; an energy storage capacitor for storing energy from said dc power source for delivering to said ac mains power supply output; a dc-to-ac converter coupled to said output for converting energy stored in said energy storage capacitor to ac power for said ac mains power supply output; a power injection control block having a sense input coupled to said energy storage capacitor and having an output coupled to said dc-to-ac converter, to control said dc-to-ac converter to control power injected into said ac mains power supply; and wherein said power injection control block is configured to track a maximum power point of said dc power source without measuring a dc voltage or dc current provided from said dc power source.

In some preferred embodiments a voltage on the energy storage capacitor has a sinusoidal voltage component (at twice the frequency of the ac mains), and the power injection control block is configured to control an amplitude of an ac current provided to the ac mains power supply output such that an amount of power transferred to the output is dependent on an amplitude of the sinusoidal voltage component on the energy storage capacitor. In embodiments the average energy transferred is linearly dependent on, more particularly proportional to, a squared value of the sinusoidal voltage component. In embodiments the sinusoidal voltage component is superimposed on a dc link voltage (input to the dc-to-ac converter), and this link voltage is relatively high, for example less than 200, 300, 400 or 500 volts. In such an embodiment the average power transferred is proportional to the difference between the peak (maximum) capacitor voltage squared and the trough (minimum) capacitor voltage squared (although alternatively a power conditioning unit may be arranged such that there is, on average, zero dc voltage on the energy storage capacitor). In embodiments the instantaneous power transferred to the ac mains power supply output is dependent on or proportional to the instantaneous value of voltage on the energy storage capacitor.

In a related aspect of the invention, therefore, there is provided a power conditioning unit with maximum power point tracking (MPPT), for delivering power from a dc power source to an ac mains power supply output, the power conditioning unit comprising: an input for receiving power from said dc power source; an output for delivering ac power to said ac mains power supply; an energy storage capacitor for storing energy from said dc power source for delivering to said ac mains power supply output; a dc-to-ac converter coupled to said output for converting energy stored in said energy storage capacitor to ac power for said ac mains power supply output; a power injection control block having a sense input coupled to said energy storage capacitor and having an output coupled to said dc-to-ac converter, to control said dc-to-ac converter to control power injected into said ac mains power supply; and wherein, in operation, a voltage on said energy storage capacitor has a sinusoidal voltage component at twice a frequency of said ac mains; wherein said power injection control block is configured for controlling an amplitude of an ac current provided to said ac mains power supply output such that an amount of power transferred to said ac mains power supply output is dependent on an amplitude of said sinusoidal voltage component on said energy storage capacitor, and wherein said power injection control block is configured to track a maximum power point of said dc power source by controlling said dc-to-ac converter.

In embodiments of the above described power conditioning units an energy flow from the dc power source to the energy storage capacitor is substantially proportional to an amount of energy change in the energy storage capacitor (this is explained further below). Further, an amount of energy drawn from the energy storage capacitor and provided to the ac mains output is controlled by the power injection control block such that the amount of ac power delivered to the ac mains power supply is dependent on the amount of energy stored in the energy storage capacitor. In such an arrangement the power arrangement control block is thereby able to track the maximum power point of the dc power source by controlling the ac power delivered to the AC mains power supply by controlling the dc-to-ac converter, without the need for MPP tracking on the front end of the power conditioning unit, which typically includes a dc-to-dc converter. In broad terms the power injection loop pulls power, in the first instance, from the dc power source and delivers this into the energy storage capacitor. In the second instance the power injection loop extracts power from the energy storage capacitor and delivers this to the AC output. The need to deliver AC power to the output results in a sinusoidal voltage component on the energy storage capacitor, and this is an intrinsic part of this control loop; typically this fluctuating sinusoidal component of (a generally dc) voltage on the energy storage capacitor has, in operation, a peak amplitude of at least 10 Volts, 20 Volts, 30 Volts, 40 Volts, 50 Volts, 60 Volts or 100 Volts. The peak amplitude of this sinusoidal voltage component depends upon the current injected into the ac mains output.

Were MPPT to be implemented at the dc input end of the power conditioning unit, for example by means of a control loop on a front end dc-to-dc converter, an MPPT tracking algorithm would generally impose a degree of ripple on the dc input voltage to the power conditioning unit, in order that the operating point of the dc power source can be varied to hence determine the maximum power operating point. The operating point automatically adjusts according to the energy change in the energy storage capacitor.

By contrast in embodiments we employ a "pull" arrangement in which power flows from the dc power source into the energy storage capacitor in effect on demand, the demand being controlled by the second, power injection control loop.

In more detail, the degree of ripple on the DC link, more particularly the ripple amplitude, is effectively a measure of the amount of power drawn from the DC input, for example a solar photovoltaic panel. If the ripple reduces this implies that less power is being provided from the DC input and in broad terms the power injection control block then responds by reducing the current injected into the grid, that is by adjusting the power injection. In embodiments the current is regulated by adjusting the switching speed (rate) of the output DC-to-AC converter. When the system is tracking the maximum power point, if the power from the DC input reduces, the ripple reduces and the switching speed of the converter is adjusted downwards, to inject less current into the grid. This brings the operating point back towards the maximum power point and balances the amount of power provided by the DC source with that being injected into the grid. The control block then periodically increases the switching speed of the power injection block with the aim of increasing the amount of current flowing into the grid. This has the effect of increasing the ripple in the event that the amount of energy being provided by the DC source is greater than that being harvested, and hence the control loop effectively operates so as to maximise the ripple and therefore harvested energy. In terms of a typical I-V characteristic (see FIG. 9, later) this corresponds to servoing around the maximum power point, more particularly moving along the characteristic curve in a direction of decreasing current and increasing voltage (as in the just mentioned example), or increasing current and decreasing voltage, towards the maximum power point.

In embodiments the power injection control block generates a template of the AC current injected into the mains. More particularly the template comprises a sinusoidal or half-sinusoidal voltage in phase with the grid mains and the amplitude of this template is adjusted dependent on the measured DC link ripple voltage, more particularly dependent on whether this has previously gone up or down. Thus in embodiments the amplitude of this template signal is responsive to the ripple voltage on the energy storage capacitor/DC link. An error signal dependent on the difference between the measured AC current injected into the grid mains and this template is used to control the switching rate of the power injection control block. In embodiments the error signal is used to increase the switching rate if the template magnitude is greater than the magnitude of the current injected into the AC mains. In this way the current injected is controlled with the aim of maximising the energy storage capacitor/DC link ripple.

As previously mentioned, in some preferred implementations the ripple amplitude at the energy storage capacitor/DC link is used to effectively measure power provided from the DC source (photovoltaic panel). However in principle other techniques may be employed to measure, at the energy storage capacitor/DC link, the power provided from the DC power source. For example absent losses the power provided by the power source may be assumed to be given by the product of voltage on and current through the DC link providing an input to the DC-to-AC converter. Nonetheless, because preferred implementations of our power conditioning unit have a ripple which is proportional to input power (assuming input and output power are substantially the same), measuring the ripple is an advantageous technique for obtaining the desired power information.

In a further aspect, therefore, the invention provides a method of maximum power point tracking (MPPT) in a power conditioning unit for delivering power from a dc power source to an ac mains power supply output, the power conditioning unit including an energy storage capacitor for storing energy from said dc power source for delivering to said ac mains power supply output, the method comprising: tracking a maximum power point of said dc power source by controlling a dc-to-ac converter converting energy stored in said energy storage capacitor to ac power for said ac mains power supply input, wherein said tracking comprises: sensing, at a circuit node coupled to said energy storage capacitor, a signal responsive to a level of power drawn from said dc power source; and controlling said dc-to-ac converter to adjust an amplitude of an ac output to substantially maximise said sensed signal.

In embodiments the signal on the energy storage capacitors/DC link is sensed and used to derive a control (template) signal having an amplitude dependent on the level of power drawn from the DC power source, more particularly on a change in this sensed level of power. Then the switching rate of the DC-to-AC converter is controlled based on a difference between the sensed AC current and this control signal, more particularly increasing the switching rate of the output converter if the control signal (template) is greater than the sensed AC current signal, and vice versa.

In some preferred embodiments a dc voltage amplification stage is included between the dc power input and the ac mains output, and this stage has a substantially constant amplification factor—that is it is not varied by a control loop to perform MPPT although, in embodiments, the constant amplification factor may be selectable, for example according to the operating environment. In embodiments a voltage amplifier control block may be provided, but not to provide a variable voltage amplification control loop but instead to act effectively as a power switch to switch on and off a path for power flow from the input to the dc-to-dc converter. Optionally, depending upon the implementation of the voltage amplification stage, the voltage amplifier control block may provide a (substantially constant duty cycle) pulse width modulation control signal to the dc voltage amplifier.

An arrangement of the type described above facilitates galvanic isolation between the dc input and ac mains power supply output since the MPPT tracking may be performed without any direct connection to the dc input for measuring voltage and/or current from the dc power source.

In an example implementation the dc-to-ac converter may comprise a buck stage converter or alternatively, for example, an "unfolding bridge" in combination with a pair of power switching devices and an output inductor may be employed, as described in our U.S. Pat. No. 7,626,834 (hereby incorporated by reference in its entirety). In embodiments the power injection control block may be configured to sense a voltage on the (dc link) energy storage capacitor, to scale this down, and to multiply this by a sine wave (of appropriate phase) to create a template signal for comparison with a sensed signal derived from the grid mains, in order to control the output current of the dc-to-ac converter. In embodiments no dc current sensing need be performed. In embodiments the power conditioning unit may include an anti-islanding function, for example as described in our U.S. application Ser. No. 10/555,803, filed Feb. 16, 2007, now issued as U.S. Pat. No. 8,067,855 (WO2004/100348) (hereby incorporated by reference in its entirety).

In preferred applications the above power conditioning unit is employed in conjunction with one or more photo voltaic devices (solar panels)—that is it is a solar inverter. In some preferred embodiments the device is employed in combination with a single solar panel and thus has a relatively low dc voltage input, although the technique may also be employed with a so-called "string" of solar panels, in which case the dc input voltage may be one or several hundred volts (in such a case the amplification factor of the dc voltage amplifier may be equal to, or even less than unity, although in general it will be greater than unity). Potentially techniques of the type we describe may also be employed with other types of dc power source, for example one or more fuel cells. In some preferred embodiments the energy storage capacitor is a non-electrolytic capacitor, for example a film, polyester, or polypropylene capacitor; the capacitor may have a value of less than 50 µF, 40 µF, 30 µF, 20 µF, or 10 µF.

In a related aspect the invention provides a method of maximum power point tracking (MPPT) in a power conditioning unit for delivering power from a dc power source to an ac mains power supply output, the power conditioning unit including an energy storage capacitor for storing energy from said dc power source for delivering to said ac mains power supply output, the method comprising: tracking a maximum power point of said dc power source by controlling a dc-to-ac converter converting energy stored in said energy storage capacitor to ac power for said ac mains power supply input, wherein said tracking is performed without measuring a dc voltage or dc current provided from said dc power source.

In a still further related aspect the invention provides a method of maximum power point tracking (MPPT) in a power conditioning unit for delivering power from a dc power source to an ac mains power supply output, the power conditioning unit including an energy storage capacitor for storing energy from said dc power source for delivering to said ac mains power supply output, wherein, in operation, a voltage on said energy storage capacitor has a sinusoidal voltage component at twice a frequency of said ac mains, the method comprising: controlling an amplitude of an ac current provided to said ac mains power supply output such that an amount of power transferred to said ac mains power supply output is dependent on an amplitude of said sinusoidal voltage component on said energy storage capacitor, wherein said controlling is performed by controlling a dc-to-ac converter converting energy stored in said energy storage capacitor to ac power for said ac mains power supply input; and tracking a maximum power point of said dc source by controlling said dc-to-ac converter.

As previously described, broadly in embodiments of such methods changing the fluctuating sinusoidal component of voltage on the (dc link) energy storage capacitor changes the voltage at the input from the dc power source and the current (from the dc power source) is forced to follow the change in voltage, in accordance with the current—voltage characteristic of the dc power source. If power is drawn from the dc link and provided to the ac mains output the dc voltage on the energy storage capacitor drops and the dc input voltage drops concomitantly (and vice versa). Thus in embodiments of the method sensing (just) the voltage on the energy storage capacitor can be employed to control both current and voltage at the input of the power conditioning unit.

The invention also provides a carrier such as non-volatile memory storing processor control code for controlling a processor to implement a method as described above.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Power Conditioning Units

Figure 1:
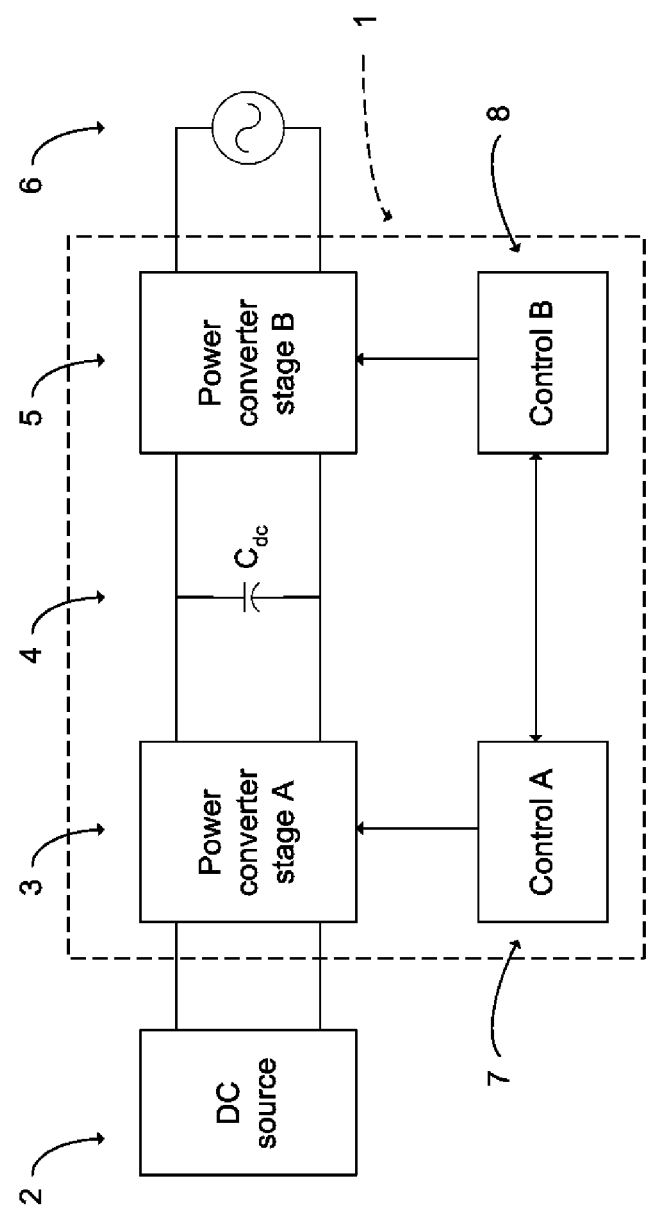
FIG. 1 shows an example power conditioning unit suitable for implementation of an MPPT tracking system according to an embodiment of the present invention.

We first describe examples of photovoltaic power conditioning units in the context of which embodiments of the MPPT (maximum power point tracking) techniques we describe may advantageously be employed.

Thus we will first describe a method to control direct current energy sources, in particular a method to control direct current energy sources that utilise power electronics converters to condition the input power into alternating current electricity that is supplied to the mains. Such power electronics converter comprises of a plurality of conversion stages and one energy reservoir in the form of a capacitor. The method presented allows the utilisation of long-lifetime polyester or polypropylene capacitors as opposed to short-lifetime electrolytic capacitors. The method uses two control algorithms: one algorithm controls the power extracted from the energy source that is supplied to the energy reservoir and another controls the transfer of power from the reservoir into the electricity mains.

In one arrangement there is provided a power conditioning unit for delivering power from a dc power source to an ac mains power supply output, the power conditioning unit comprising: a power conditioning unit input for receiving power from said dc power source; a power conditioning unit output for delivering ac power; an energy storage capacitor; a dc-to-dc converter having an input connection coupled to said power conditioning unit input and an output connection coupled to the energy storage capacitor; and a dc-to-ac converter having an input connection coupled to said energy storage capacitor and an output connection coupled to said power conditioning unit output; wherein said energy storage capacitor is a non-electrolytic capacitor; and wherein said power conditioning unit comprises two control blocks, a first, power extraction control block to control said dc-to-dc converter to control power extracted from said dc power source and provided to said energy storage capacitor, and a second, power injection control block to control said dc-to-ac converter to control power injected into said ac mains power supply from said energy storage capacitor; and wherein said power extraction control block has an input coupled to said power conditioning unit input for receiving power from said dc power source and has an output to control said dc-to-dc converter and is configured to regulate a voltage of said dc power source to control power extracted from said dc power source to said energy storage capacitor.

The ac mains power supply output may be connected to the utility grid, so that the power conditioning unit delivers power into the grid, or it may be a standalone power supply output for supplying power to electrical appliances.

The dc-to-ac converter may be configured to deliver a substantially sinusoidal current or voltage to the ac mains power supply output regardless of a voltage on the energy storage capacitor. This may be achieved by maintaining a current or voltage to the power supply output substantially at a reference sinusoid current or voltage. This may comprise controlling transistors in the dc-to-ac converter responsive both to a voltage or current from the energy storage capacitor and to the current or voltage to the power supply output.

The energy storage capacitor may comprise a non-electrolytic capacitor such as a film-type capacitor (for example polyester or polypropylene). The value of the capacitance may be directly proportional to the maximum power transfer capability, that is, the rated power of the apparatus. This value may be lower than that of the capacitor in a conventional power conditioning unit with the same power rating. For example, less than 20 microfarads, less than 15 microfarads, less than 10 microfarads, less than 5 microfarads or another size available for a non-electrolytic capacitor.

We will also describe a dc-to-dc converter for delivering power from a dc power source to a dc output, the converter being configured to maintain a voltage on the dc power source substantially constant over a range of dc output voltages, the converter comprising an input for receiving power from said dc power source, an output for delivering dc power, at least one power device for transferring power from the input to the output, a sensing circuit for sensing a voltage on said input, and a driver circuit for driving said at least one power device responsive to said sensing to control said power transfer.

We will also describe an inverter for delivering power from a dc power source to an ac output, the inverter being configured to maintain a substantially sinusoidal output voltage or current over a range of dc power source voltages, the inverter comprising an input for receiving power from said dc power source, an output for delivering ac power, at least one power device for transferring power from the input to the output, a low-pass filter coupled to said input, a sensing circuit for sensing an output from the low-pass filter and comparing with a reference, and a driver circuit for driving said at least one power device responsive to said sensing to control said power transfer.

We will also describe a power conditioning unit for delivering power from a dc power source to an ac mains power supply output, wherein a link capacitor of the power conditioning unit connected in parallel between an output of a dc-to-dc converter of said power conditioning unit and an input of a dc-to-ac converter of said power conditioning unit is not an electrolytic capacitor.

We will also describe a method of controlling a power conditioning unit for delivering power from a dc source into an ac electricity supply, the power conditioning comprising: an input for connecting the dc power source; an output for connecting the electricity supply; a first, dc-to-dc power conversion stage for voltage conditioning of the dc power source; a second power conversion stage for power injection into the ac electricity supply; and a dc link energy storage capacitor for energy buffering from the dc power source to the electricity supply; wherein the method comprises controlling said second power conversion stage to control an amplitude of an ac current provided to said ac electricity supply output such that an amount of power transferred to said ac mains power supply output is dependent on a peak amplitude of a fluctuating sinusoidal component of a dc voltage on said energy storage capacitor.

Thus an example power conditioning unit uses a system for controlling the transfer of power from a dc energy source, such as a solar panel, fuel cell, dc wind turbine, etc, into the electricity mains supply, and in particular allows the replacement of short-lifetime energy reservoirs by long-lifetime polyester or polypropylene capacitors.

The energy control and MPPT techniques we describe can be used in any power electronics converter device (1) as shown in FIG. 1. This apparatus (1) is made of three major elements: a power converter stage A (3), one reservoir capacitor $C_{dc}$ (4), and one power converter stage B (5). The apparatus (1) has a plurality of inputs connected to a direct current (dc) source, such as a solar or photovoltaic panel array (2) comprising one or more dc sources connected in series and/or in parallel. The apparatus (1) is also connected to the electricity supply (6) so that the energy extracted from the dc source (1) is transferred into the mains (6).

The power converter stage A (3) may be of different types: it can be a step-down converter where the voltage at the input is decreased using some power electronics topology; it can be a step-up converter where the input voltage is amplified using a different type of power electronics circuit; or it can do both amplify and attenuate the input voltage. In addition, it may provide electrical isolation by means of a transformer or a coupled inductor. In whatever case, the electrical conditioning of the input voltage should be such that the voltage across the capacitor $C_{dc}$ (4) remains higher than the grid voltage (6) magnitude at all times. Also, this block contains one or more transistors, inductors, and capacitors. The transistor(s) are driven through a pulse width modulation (PWM) generator. The PWM signal(s) have variable duty cycle, that is, the ON time is variable with respect to the period of the signal. This variation of the duty cycle effectively controls the amount of power transferred across the power converter stage A (3).

The power converter stage B (5) injects current into the electricity supply (6). Therefore, the topology utilises some means to control the current flowing from the capacitor $C_{dc}$ (4) into the mains (6). The circuit topology can be either a voltage source inverter or a current source inverter.

Figure 2:
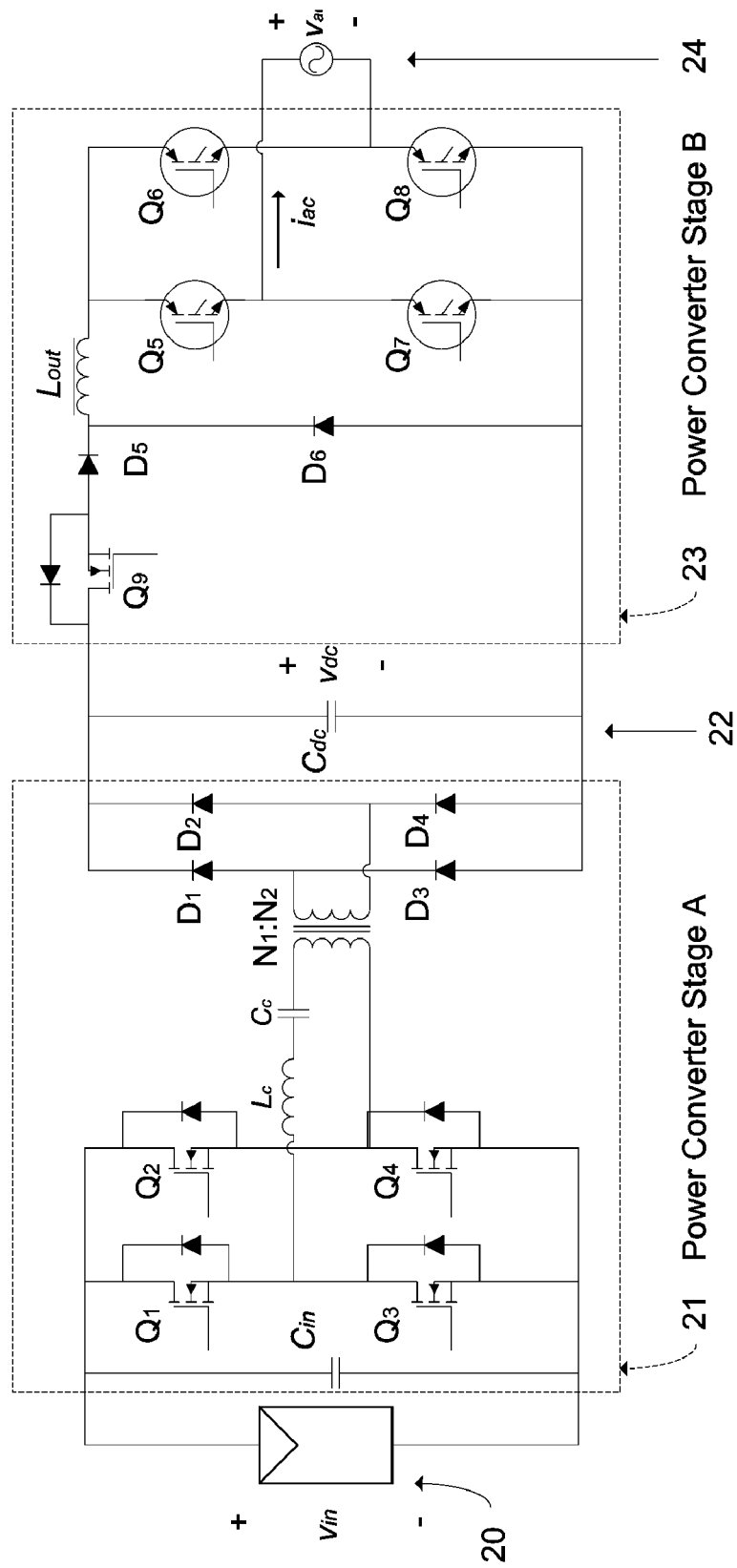
FIG. 2 shows details of the power conditioning unit suitable of FIG. 1.

FIG. 2 shows an example of a power conditioning unit to which the control system of FIG. 1 may be applied. In FIG. 2 Q1-Q4, D1-D4 and the transformer form a voltage amplifier; Q9, D5, D6 and Lout perform current shaping; and Q5-Q6 constitute an "unfolding" stage. Control A (7 in FIG. 1) may be connected to the control connections (e.g. gates or bases) of transistors in power converter stage A (21) to control the transfer of power from the dc energy source (20). The input of this stage is connected to the dc energy source and the output of this stage is connected to dc link capacitor 22.

This capacitor stores energy from the dc energy source for delivery to the mains supply (24). Control A may be configured to draw a substantially constant power from the dc energy source regardless of the dc link voltage $V_{dc}$ on $C_{dc}$.

Control B (8 in FIG. 1) may be connected to the control connections of transistors in power converter stage B (23) to control the transfer of power to the mains supply. The input of this stage is connected to the dc link capacitor and the output of this stage is connected to the mains supply. Control B may be configured to inject a substantially sinusoidal current into the mains supply regardless of the dc link voltage $V_{ac}$ on $C_{dc}$.

Figure 3:
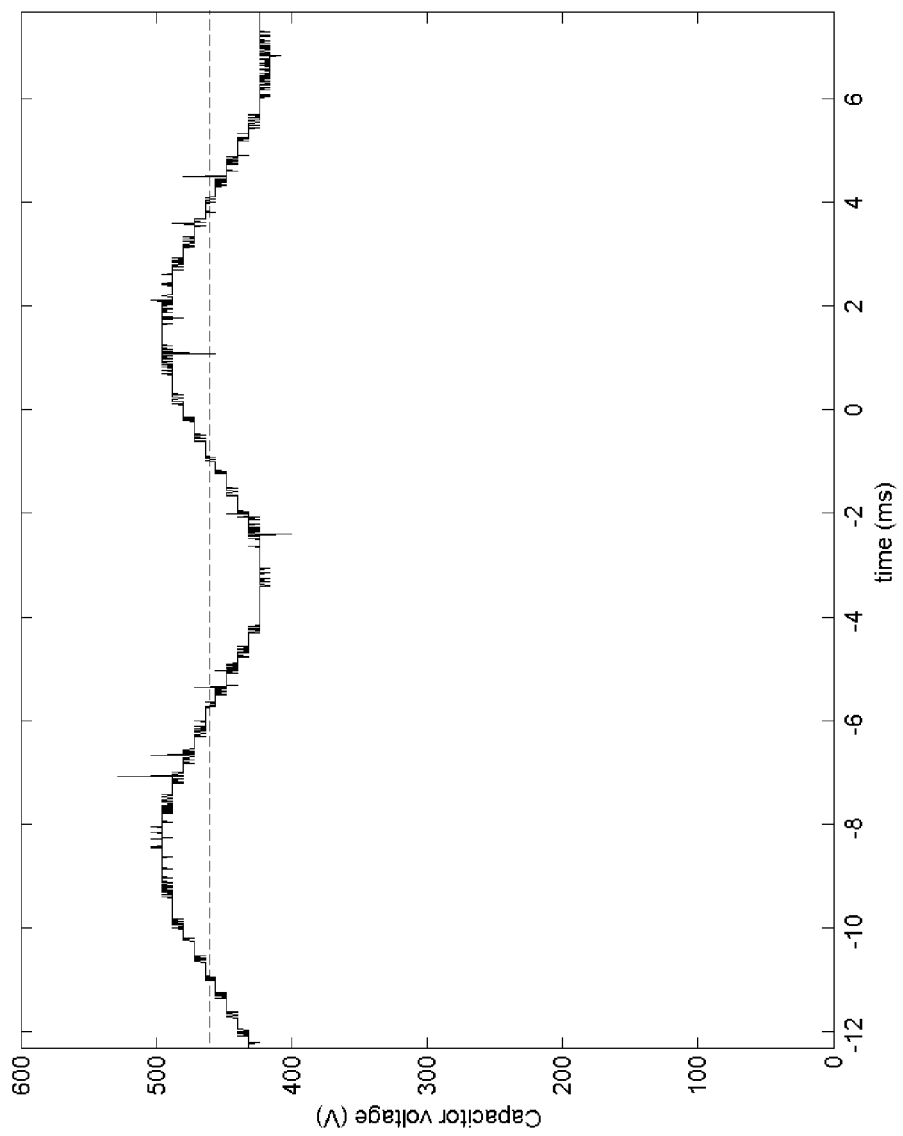
FIG. 3 shows the DC capacitor voltage in the power conditioning unit of FIG. 1.

The capacitor $C_{dc}$ (4) acts as an energy buffer from the input to the output. Energy is supplied into the capacitor via the power stage A (3) at the same time that energy is extracted from the capacitor via the power stage B (5). The system provides a control method that balances the average energy transfer and allows a voltage fluctuation, resulting from the injection of ac power into the mains (6), superimposed to the average dc voltage of the capacitor $C_{dc}$ (4), as shown in FIG. 3. The figure shows an average voltage of 475V and a 100 Hz fluctuation of peak amplitude of 30V. The peak amplitude depends on the amount of power being transferred from the input (2 in FIG. 1) to the output (6). The frequency of the oscillation can be either 100 Hz or 120 Hz depending on the line voltage frequency (50 Hz or 60 Hz respectively).

Two synchronised and independent control blocks control the system (1): a control block A (7) that directly controls the power stage A (3), and a control block B (8) that directly controls the power stage B (5).

Figure 4:
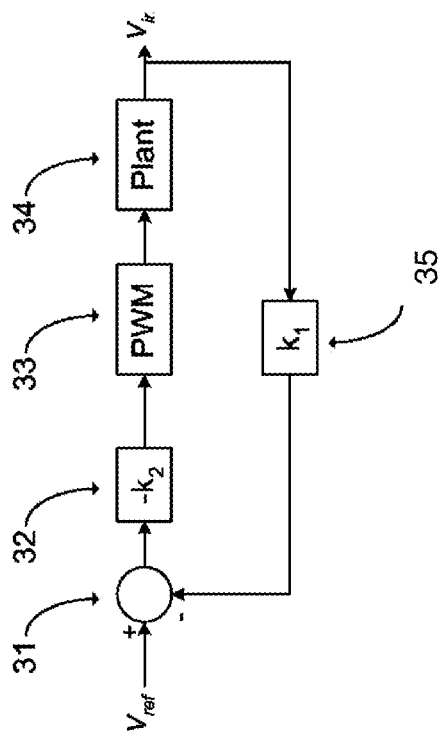
FIG. 4 shows control block A in the power conditioning unit of FIG. 1.

Control block A (7) has the configuration shown in FIG. 4. It comprises an adder (31), a negative proportional gain (32), a PWM generator (33), the system plant (34), and a feedback gain (35). This control block regulates the voltage across the dc source (2). This voltage, $v_{in}$, is measured and adjusted by gain $k_1$ (35). It is then subtracted to a voltage reference, $V_{ref}$, using the adder (31). The error, $(v_{ref}-k_1v_{in})$, is then amplified by a factor of $-k_2$. The resulting signal is negatively proportional to the error. Therefore, a positive error generates a decrement in the driving signal and conversely. This driving signal is input to a PWM generator (33) that can be a microcontroller, or a PWM integrated circuit. This block generates digital pulses that, in turn, drive the transistors of the power stage A (3) that is equivalent to the plant (34).

Figure 5:
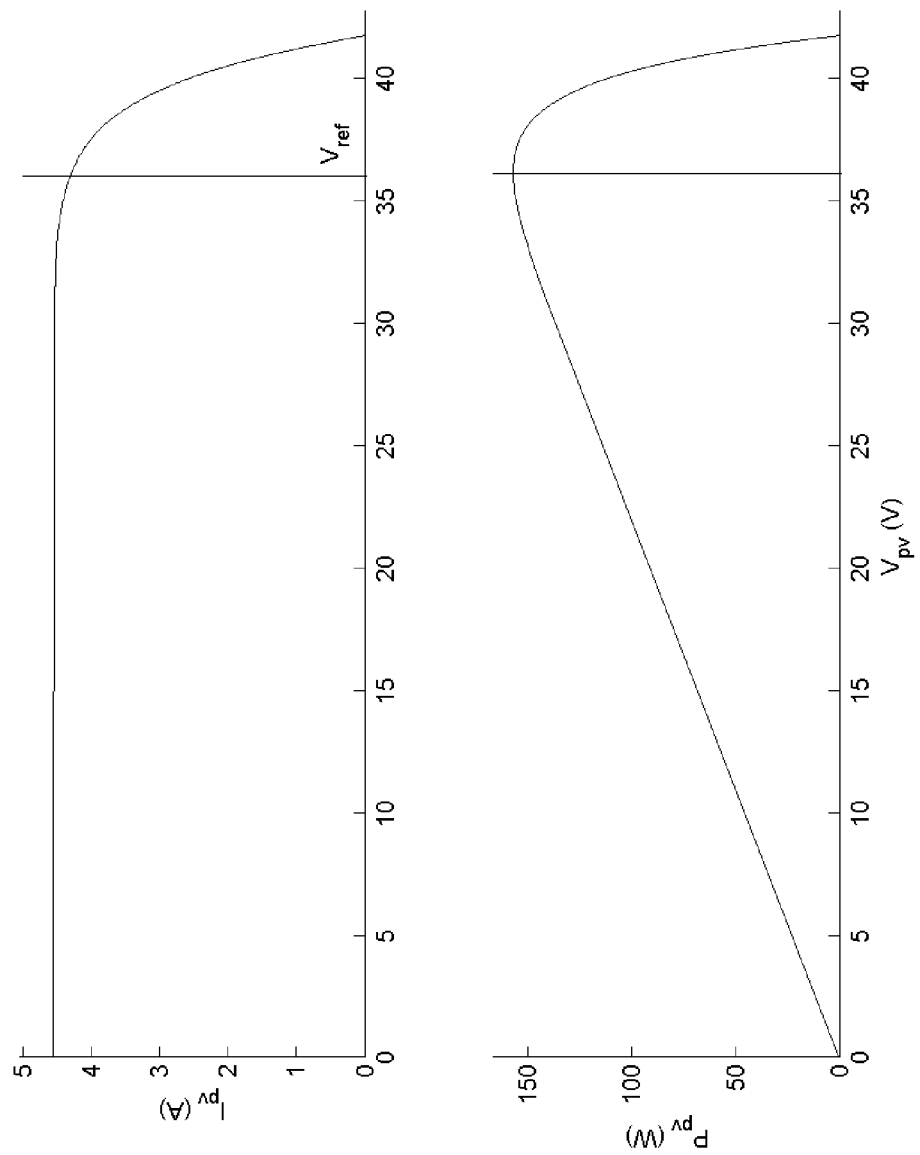
FIG. 5 shows example characteristics of a photovoltaic panel array as known in the art.

Controlling the dc source (2) voltage directly controls the power being transferred across power stage A (3) as is shown in FIG. 5 for a photovoltaic panel array.

Figure 6:
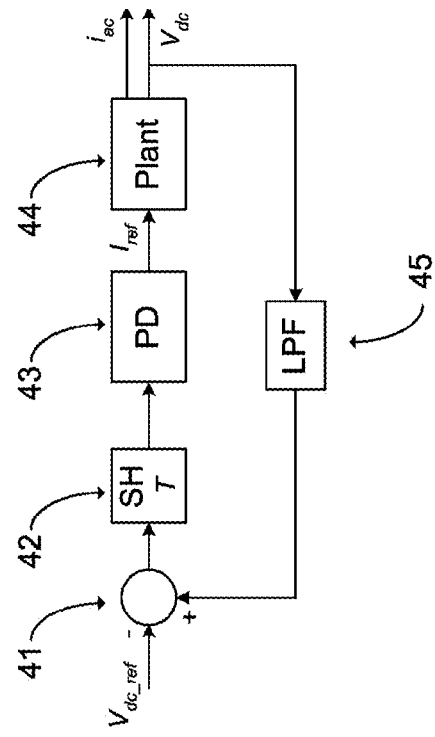
FIG. 6 shows control block B in the power conditioning unit of FIG. 1.

Control block B (8) has the configuration shown in FIG. 6. It comprises an adder (41), a sample and hold (SH) with period T block (42), a proportional-derivative (PD) compensator (43), the system plant (44), a low-pass filter (LPF) feedback block (45). This control block regulates the average voltage across capacitor $C_{dc}$ (4). Because the voltage, $v_{dc}$, contains the sum of a constant voltage and a fluctuating sinusoidal component, the signal is scaled and filtered using the LPF block (45). This generates a constant voltage that is compared against a reference, $V_{dc\_ref}$, using adder (41). The error is measured every T seconds using a Sample and Hold, SH, block (42). The resulting sampled error is forwarded to a PD compensator (43) that sets the amplitude of the current injected to the mains (6) via power stage B (5). The update of this current reference, $I_{ref}$, amplitude is done every T seconds, which is the inverse of the line voltage frequency. Hence, it can take the values of 0.02 or 0.0167 seconds for a line frequency of 50 or 60 Hz respectively. This is needed in order to prevent current injection distortion.

Figure 7:
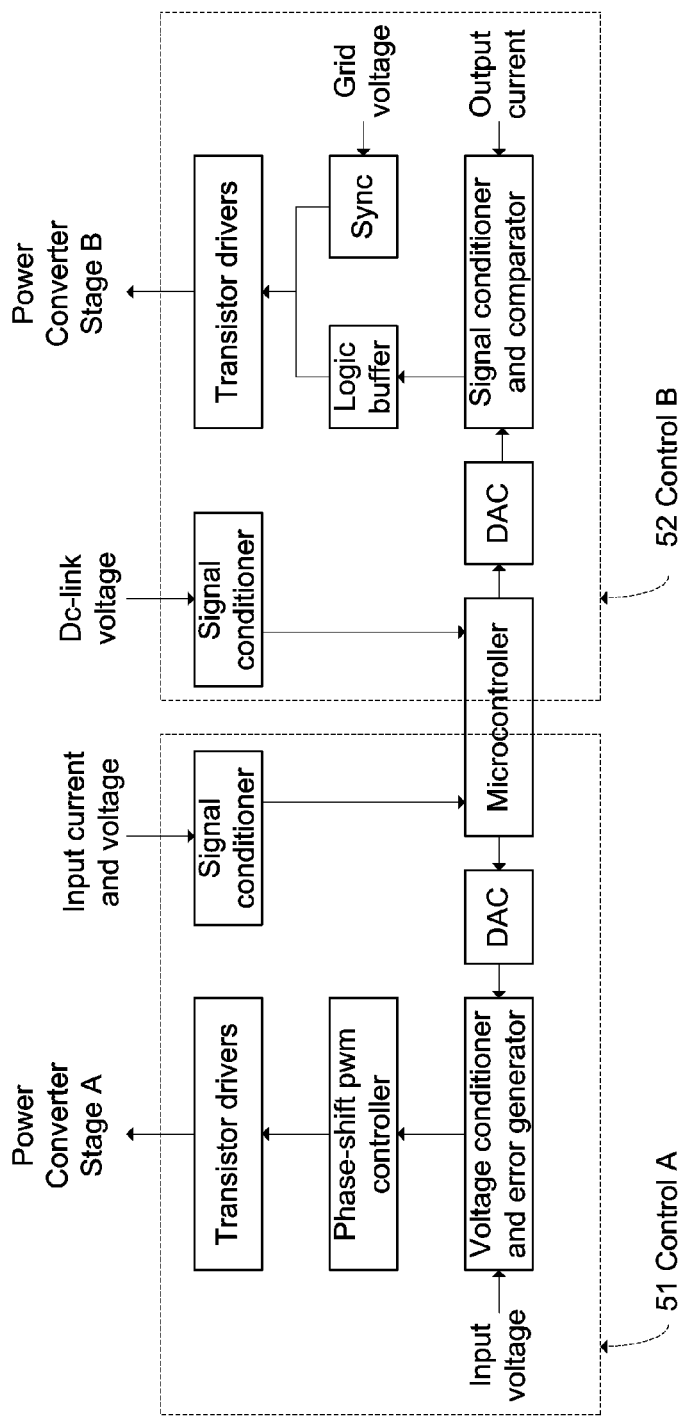
FIG. 7 shows details of examples of control blocks A and B for the power conditioning unit of FIG. 1.

An implementation of control blocks A and B is shown in FIG. 7. Both blocks operate independently but share a common microcontroller for simplicity. The microcontroller performs the control strategy depicted in FIG. 6 for block B. In addition the microcontroller could incorporate some means of maximum power point tracking control in case the input source is a photovoltaic panel in block A in order to generate a reference input voltage used in FIG. 4. Consequently the input voltage and current and the dc-link voltage are fed into the microcontroller via an arrangement of operational amplifiers or signal conditioning blocks.

The control shown in FIG. 4 for block A is implemented using analogue electronics in the form of operational amplifiers and the phase-shift PWM controller depicted in FIG. 7 (51). As mentioned before, the input voltage reference is obtained through the microcontroller via a digital to analogue converter (DAC). The proportional error is obtained inside the phase-shift PWM controller that, in turn, generates PWM signals for the transistors of stage A (21).

Implementation of control B (52) includes a current transducer that senses the rectified output current. This signal is conditioned to appropriate voltage levels using operational amplifiers and is then compared against a reference current. The reference current is generated in the microcontroller by an algorithm shown in FIG. 6 and the resulting digital word is sent to a DAC in order to get an analogue, instantaneous, current reference. Changes to the current magnitude are done in a periodic basis (with period equal to the grid voltage period) in order to avoid current distortion. The result of the comparison between the reference and the actual current is buffered through a D flip-flop which, in turn, drives transistor Q9 in FIG. 2. Transistors Q5-Q8 form a full-bridge that switches at line frequency using an analogue circuit synchronised with the grid voltage. Transistors Q5 and Q8 are on during the positive half cycle of the grid voltage and Q6 and Q7 are on during the negative half cycle of the grid voltage.

Figure 8:
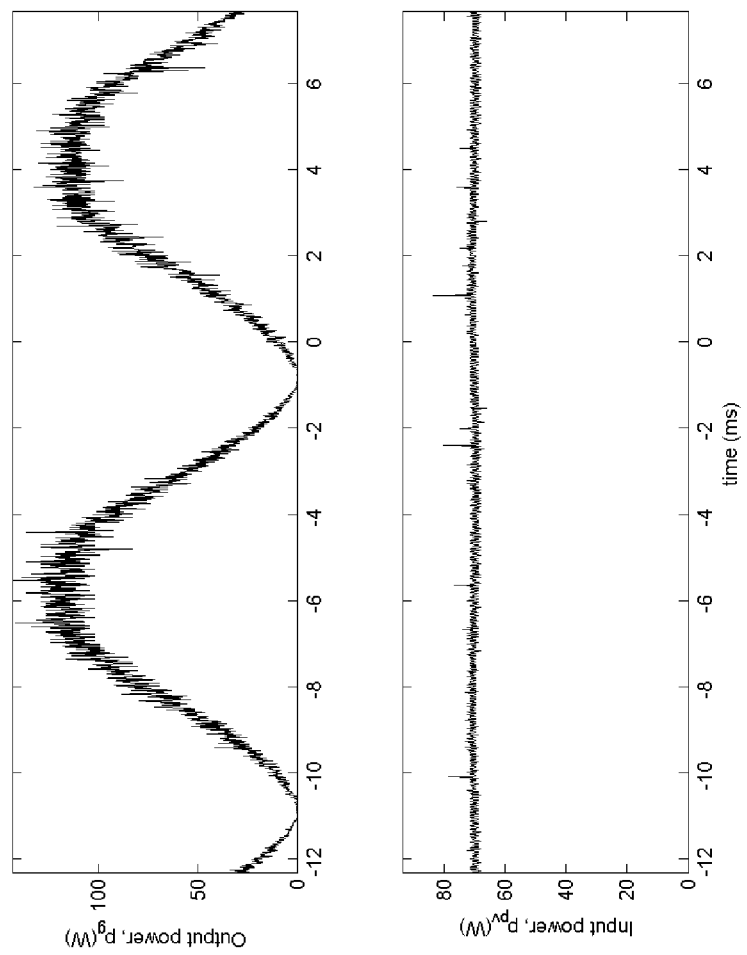
FIG. 8 shows output and input powers for the power conditioning unit of FIG. 1.

FIG. 8 shows the output and input powers using the aforementioned control. Clearly, the instantaneous power output is a sinusoid superimposed to an average positive value. In contrast, the input is constant throughout the period of the line voltage. The power difference creates an energy mismatch that is absorbed in capacitor $C_{dc}$. This effectively appears as a fluctuation across the capacitor, as is shown in FIG. 3.

MPPT (Maximum Power Point Tracking) Techniques

We will describe a method and system for tracking the maximum power point of an energy generator and extracting maximum power from such a generator when coupled to the load. In embodiments the method/system comprises two independent control blocks. The first block controls the voltage amplification stage that interfaces with the energy generator. The energy generator is preferably a solar module. In embodiments the first control block does not function to regulate the amount of energy to be transmitted but functions only as a switch, either allowing energy flow or preventing any energy flow from the generator and through the amplification stage, regardless of the amount. The output of the voltage amplification stage is coupled to an energy reservoir capacitor. Energy flow is therefore dependent on the amount of "room" (the amount of additional energy which can be stored) in the reservoir capacitor. The second control block is a feedback control loop that interfaces the energy reservour capacitor to the coupled output load. The second control block regulates the amount of power to be injected into the load by emptying the energy reservoir capacitor. The second control block uses, in embodiments exclusively, the level of voltage fluctuations on the energy reservoir (storage capacitor) to control the amount of power being extracted from the energy generator and also the amount of power being injected into the load. In embodiments no use of (measured) current values is made. Thus in embodiments the maximum power point tracking uses two completely independent loops and uses exclusively variations characteristic of the reservoir capacitor.

Figure 9:
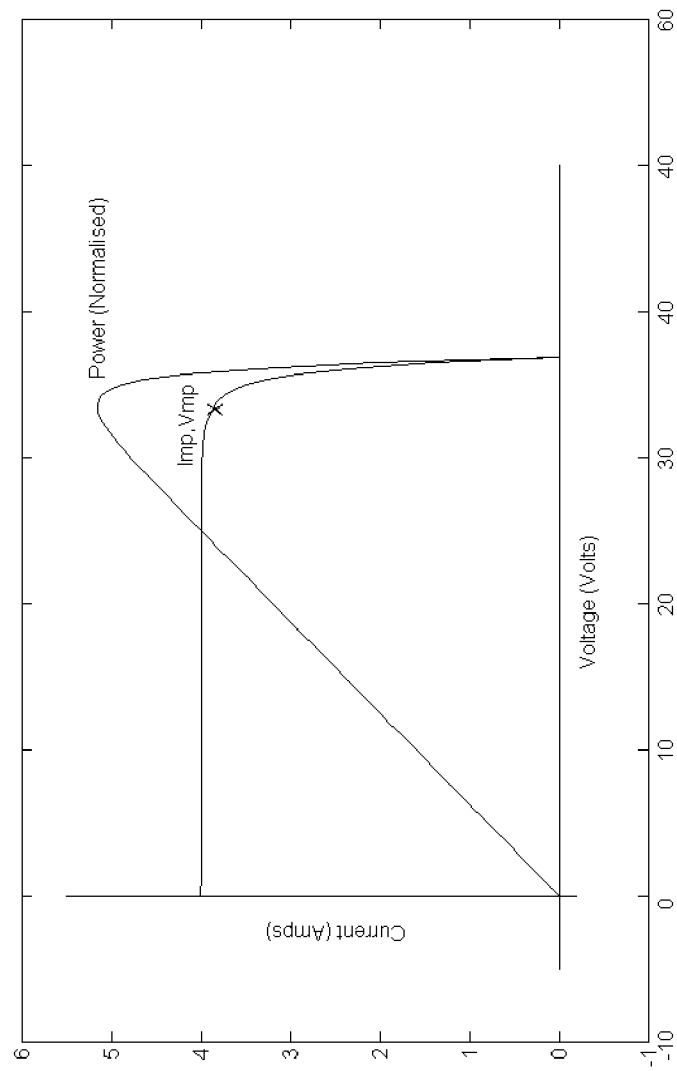
FIG. 9 shows further example characteristics of a photovoltaic panel array.

Some energy generators, such as solar photovoltaic cells, constitute a non-linear power characteristics profile such as one illustrated in FIG. 9. In the figure maximum power is harvestable at the point labelled X, which exhibits maximum power point current Imp and voltage Vmp. It is preferable that the operating point that yields most energy is attained and maintained. The method we describe does not use the voltage and current values measured at the output of the generator to perform maximum power point tracking. Instead the method measures the voltage fluctuations in the DC link and uses the measured values to track the maximum power point.

Figures 10, 11:
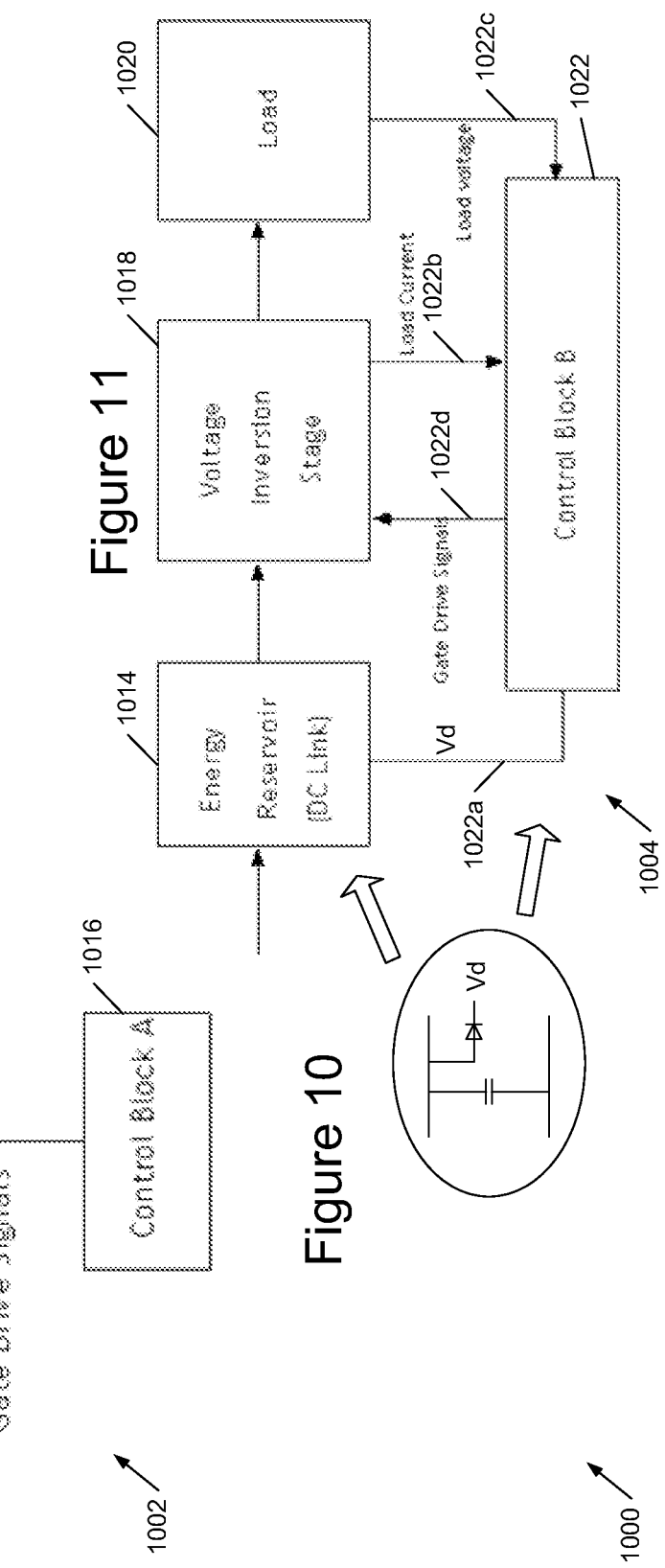
FIG. 10 shows a block diagram of an example dc input portion of a photovoltaic power conditioning unit incorporating an MPPT tracking system according to an embodiment of the invention.
FIG. 11 shows a block diagram of an example ac output portion of a photovoltaic power conditioning unit incorporating an MPPT tracking system according to an embodiment of the invention.

Referring to FIGS. 10 and 11, these show a block diagram of input 1002 and output 1004 stages of an embodiment of a solar PV power conditioning system 1000 incorporating an MPPT control methodology for the dc input side of the power conditioning unit according to an embodiment of the invention. Thus FIG. 10 shows an energy generator 1010 such as one or more PV panels feeding a voltage amplification stage 1012 with a substantially constant amplification factor (which may be less than, equal to, or greater than unity depending, for example, on whether the dc input is from a single PV panel or a string of series connected panels). This in turn provides power to an energy reservoir 1014, in embodiments a storage capacitor coupled to a dc link between the input, voltage amplification stage and an output, voltage inversion stage. Control block A 1016 controls voltage amplification stage 1012, but in embodiments only to switch power from the energy generator on and off into the energy reservoir. In embodiments control block A does not provide a variable gain control and simply comprises a fixed frequency oscillator. Voltage inversion stage 1018 has an input coupled to the energy reservoir 1014 and provides an ac mains output to load 1020, for example via a grid connection. Control Block B 1022 monitors the voltage on the dc link via sense connection 1022a (but in embodiments does not sense the current on this link), and the current into and voltage on the load via sense connections 1022b,c (in embodiments connection 1022c is within the power conditioning unit), and provides gate drive output signals 1022d for controlling the voltage inversion ("unfolding") stage 1018, more particularly for controlling the power drawn from the energy reservoir and provided into the load via the grid. The gate drive signals 1022d are sequenced to control the power converter switches of the power conversion stage 1018 (see also FIG. 2); this provides a convenient technique for controlling the switching frequency of this stage.

In FIG. 10, control block A functions as a power switch, allowing power to flow from the energy generator to the voltage amplification stage (or effectively switching the voltage amplification stage on/off or in/out). Control block A can also be set to turn off power from the energy generator in the event of over-voltage and under-voltage conditions.

The voltage amplification stage can have a fixed amplification ratio or a selectable or multiplexable ratio such as may be provided by a tapped transformer. The voltage amplification stage may comprise a half-bridge, a full bridge, a push-pull or a similar voltage inversion stage. Such an inversion stage may comprise semiconductor switching devices such as MOSFETs. The voltage inversion stage can be coupled to a transformer, whose amplification ratio results in a desired voltage in the DC link reservoir capacitor, for example of order 400 volts. The output of the transformer is coupled to a rectifier stage. An inductor may be included between the rectifier bridge and the DC link reservoir capacitor.

Depending on the input voltage the voltage amplification stage 1012 may provide an amplification in the range ×5 to ×20, for example around ×12 for a dc input voltage of ~35 volts, giving a dc link voltage of around 420 volts.

Figure 12:
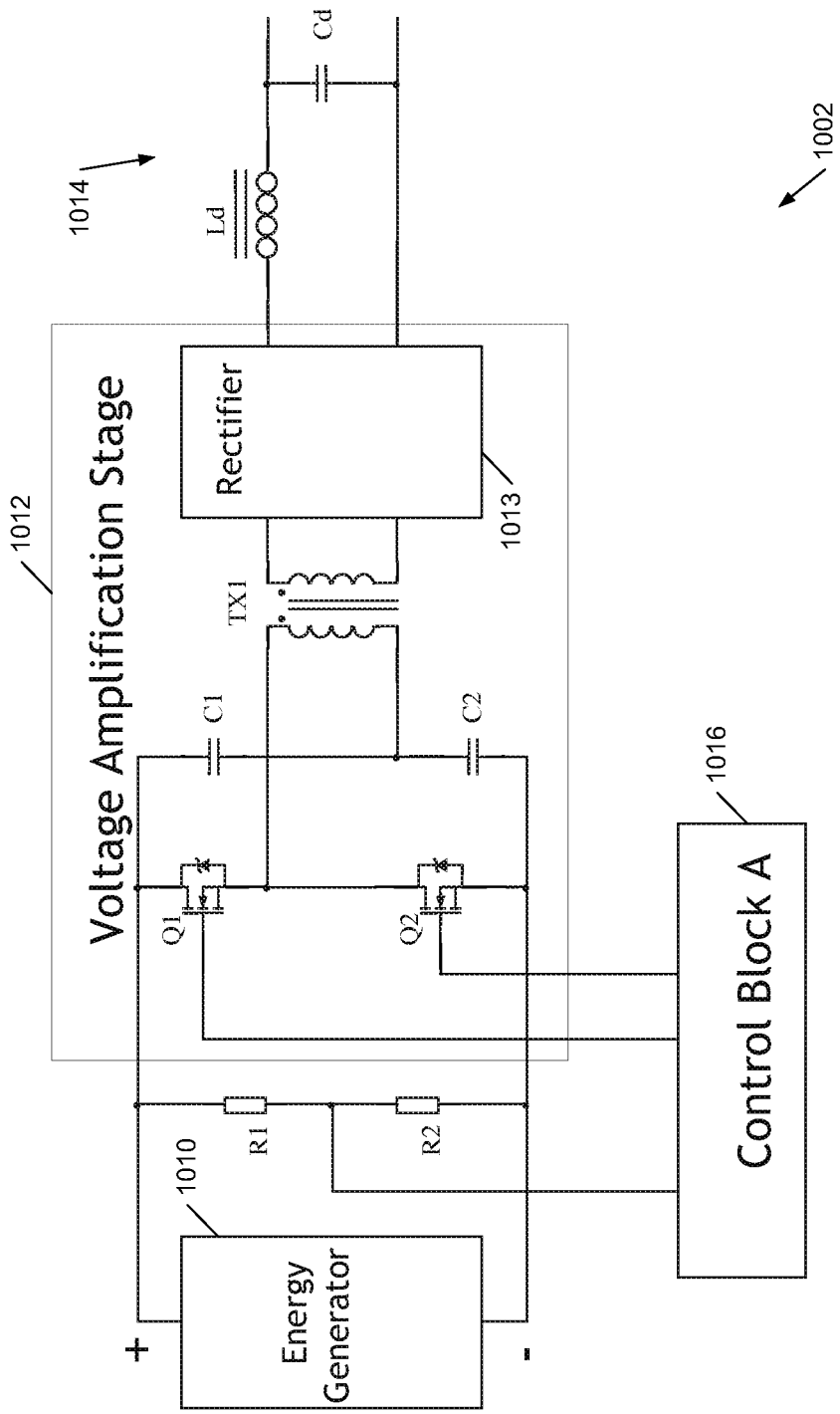
FIG. 12 shows a circuit diagram of an example dc input portion of a photovoltaic power conditioning unit incorporating an MPPT tracking system according to an embodiment of the invention.

FIG. 12 shows a more detailed circuit diagram of an example input stage 1002 implementing the control methodology we describe. The energy generator may be a solar module or a group of solar modules. In this example the voltage amplification stage comprises a half-bridge, which in turn is made up of two series switches (MOSFETs), Q1 and Q2, and two series capacitors C1 and C2, and the transformer TX1. A rectifier bridge 1013 made up of diodes is coupled to the output of the transformer. The rectifier bridge is itself coupled to the DC link capacitor Cd via a filter inductor Ld. The control block in FIG. 12 produces a constant duty cycle PWM signal, and hence no modulation is implemented. In the event that Cd is full, defined as the voltage across it being equal or larger than the rectified output from transformer secondary, no power flows into Cd even though Q1 and Q2 are switched on and off continuously. Hence control block A does not regulate the amount of power extracted from the generator.

Figure 13:
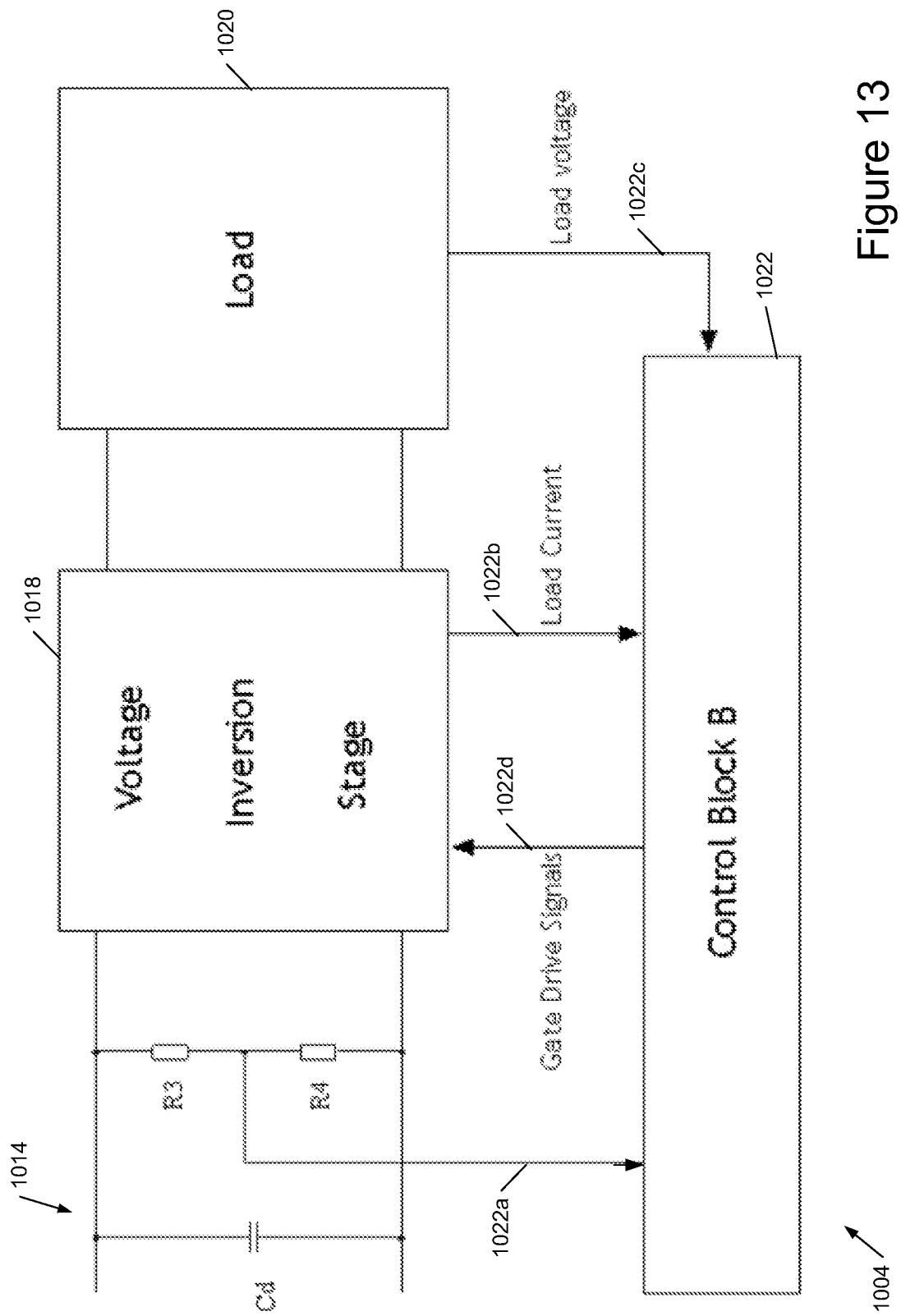
FIG. 13 shows details of an ac output portion of a photovoltaic power conditioning unit incorporating an MPPT tracking system according to an embodiment of the invention.

FIG. 13 shows a more detailed circuit diagram of an example output stage 1004 implementing the control methodology we describe. Referring to FIG. 13, control block B measures the voltage fluctuations in the DC link that are used for regulation of the amount of power being harvested from the energy generator and therefore the amount of power injected into the load. A preferred load is the utility grid. In the case of the grid load, control B measures the peak and trough voltages on the DC link capacitor via a scaling circuit (the potential divider circuit of R3 and R4). The scaled values of the peak Vp and the trough Vt voltages are used to compute the amount of power flowing through the capacitor (as described below). In embodiments the voltage sense connection to Control Block B is via a rectifier).

Energy Storage and DC Link Capacitance

Figure 14:
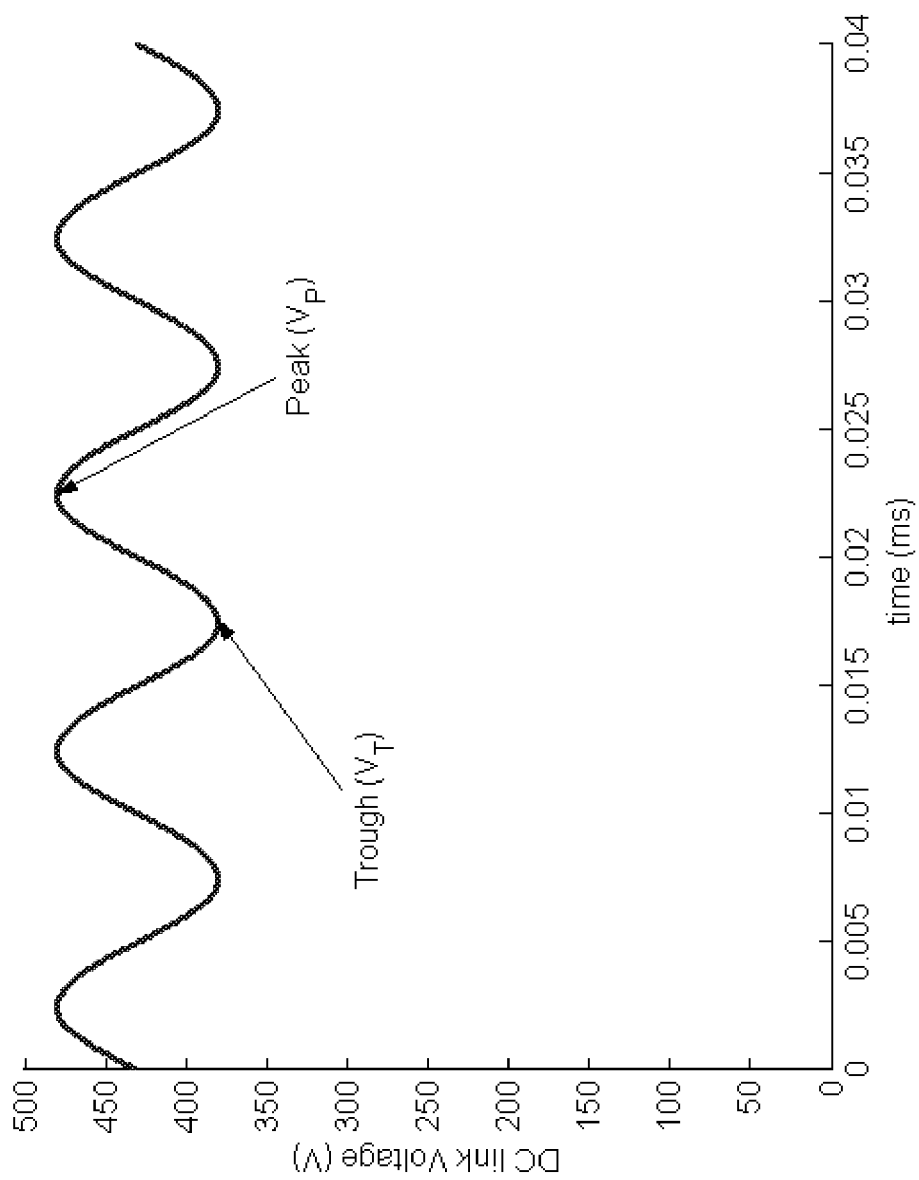
FIG. 14 shows the voltage on a DC link capacitor voltage in a photovoltaic power conditioning unit incorporating an MPPT tracking system according to an embodiment of the invention, illustrating a sinusoidal component of the voltage.

Due to the AC nature of the power being transferred into the grid and the current-voltage characteristic of the power being generated by the solar module, energy storage is essential in a PV inverter if maximum power is to be harvested from the solar module. In our preferred design, energy storage is delegated to the DC link reservoir capacitor. The amount of power transferred into the grid is related to the energy change in the capacitor and therefore the voltage ripple on the capacitor. One advantage of implementing energy storage on the DC link is that a large ripple can be allowed on the capacitor. Equation 1 illustrates the relationship between energy change, the capacitance and the voltage on the capacitor:

$$U_R = \frac{1}{2} C_{dc} (V_P^2 - V_T^2) \quad (1)$$

where $V_p$ is the capacitor peak voltage and $V_T$ is the capacitor trough voltage. The power transferred would be the energy change per second. FIG. 14 illustrates the fluctuation (sinusoidal ripple) on the DC link capacitor.

Thus block B automatically achieves MPPT by regulating the amount of injected current with reference to (dependent on) the dc link voltage fluctuation.

However, the MPPT tracking technology we have described is not restricted to operating in the context of a power conditioning unit which deliberately allows (and controls based on) a degree of ac ripple on the dc link. It may therefore be helpful to enlarge upon the description of the operation of embodiments of the technique. Consider an input current and voltage I, V to the inverter provided by a photovoltaic power source, a dc link current and voltage $I_d$, $V_d$, and a output current and voltage into grid mains of $I_{grid}$, $V_{grid}$. Since $V_{grid}$ is approximately constant, the power injected into the grid mains is proportional to $I_{grid}$. Also, absent losses, the input power I·V=$I_d$·$V_d$, and thus $I_d$·$V_d$ determines the point on the photovoltaic IV characteristic at which the system operates. Broadly speaking the system senses the ripple on $V_d$ which, in embodiments, (as described above) is a measure of the power flowing through the dc link. More particularly the system controls the output "unfolding" stage (for example a buck stage converter) to maximise the level (amplitude) of this ripple component on the dc link voltage/energy storage capacitor, and hence also to maximise the power injected into the ac mains. (The skilled person will appreciate that $V_d$ on its own does not provide a good measure of the power on the dc link).

In a preferred implementation the control block 1022 generates a half sinusoidal template voltage (with an amplitude varying between zero and 3.3 volts) in phase with the grid, for comparison with a (rectified) version of the sensed load current 1022b. The sensed load voltage 1022c is used only to determine the phase of the ac mains. The amplitude of the template is adjusted dependent on the level of ripple sensed on the energy storage capacitor/dc link (via line 1022a). If the template amplitude is greater than the amplitude of the sensed grid current the switching frequency is increased to inject more power into the grid, and vice versa. Thus, broadly speaking, the amplitude of the template is adjusted dependent on the dc link ripple and the output current is controlled to match the template amplitude.

Figure 15:
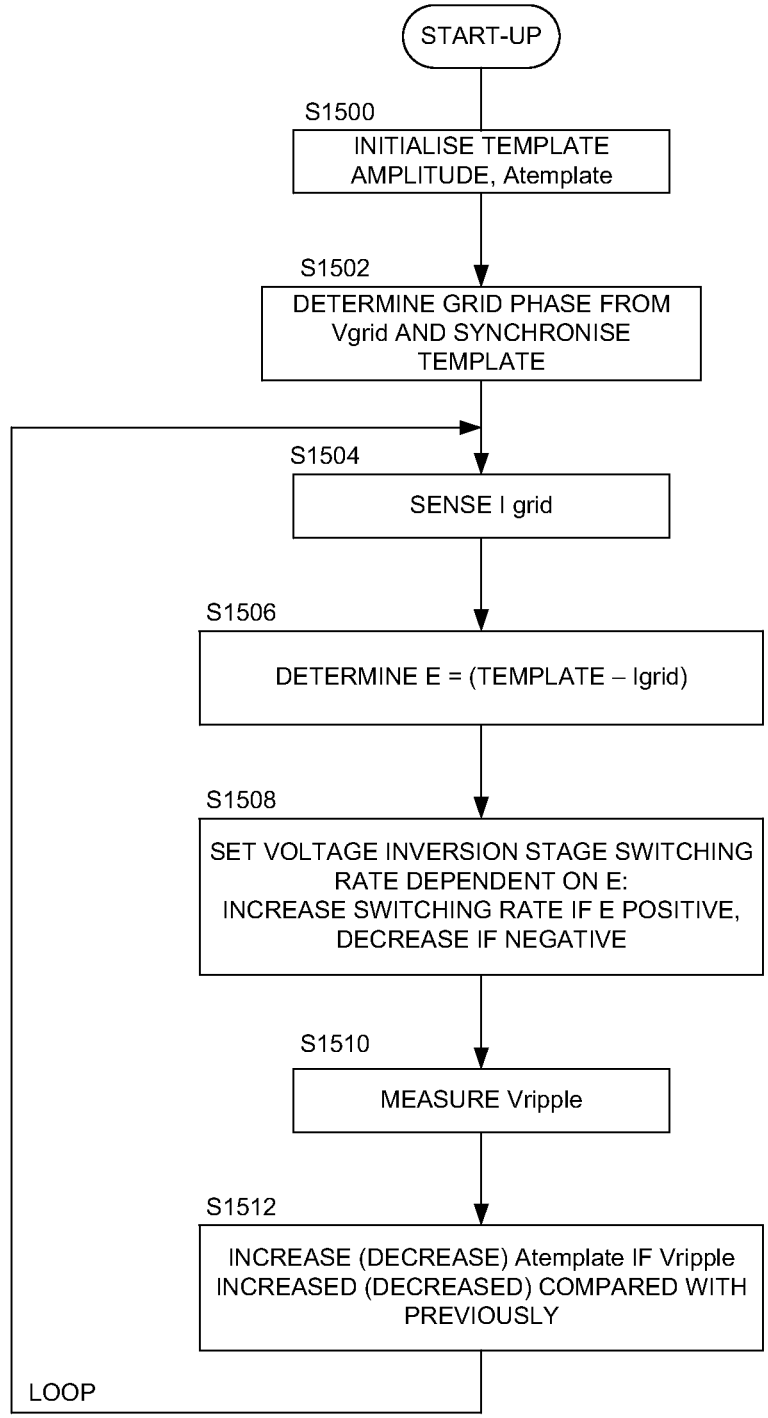
FIG. 15, shows an example control procedure for the power injection control block of a power conditioning unit with maximum power point tracking according to an embodiment of the invention.

Referring now to FIG. 15, this shows an example control procedure for control block B 1022. FIG. 15 is an example; the skilled person will appreciate that many variations are possible.

Presuming that the procedure begins at start-up of the inverter, the procedure first initialises the amplitude of the template signal to an arbitrary, relatively low value, for example 0.5 volts on the previous 0.-3.3 volts scale (step S1500). Referring again to FIG. 9, at this point the output voltage from the photovoltaic panel is at a maximum and the output current is at substantially zero; the level of ripple on the dc link is also substantially zero.

The procedure determines the phase of the ac grid mains voltage (S1502) and synchronises the half-sinusoidal template to the grid. The procedure then senses the grid current (S1504), for example by sensing the voltage across a current sense resistor; at start-up this will be approximately zero. The procedure then determines an error value E from the difference between the template and the sensed grid current (S1506), which at start-up (continuing the previous example) will be 0.5. The procedure then determines a switching rate for the voltage inversion stage 1018 dependent upon this error, in one example algorithm increasing the switching rate if E is positive and decreasing the rate if E is negative. Thus in the present example, at start-up the template amplitude is greater than that of the sensed grid current so the switching rate is increased. This increases the current (and hence power) injected into the ac grid mains, so that the ripple voltage on the dc link also increases.

At step S1510 the procedure measures the ripple voltage on the dc link and, at step S1512, adjusts the template amplitude dependent on this measurement, more particularly increasing the amplitude if the ripple voltage increased, and vice versa. The procedure then loops back to step S1504 to once again sense the current being injected into the ac mains. Thus, for example, if the error is positive the template amplitude increases so that it is once again greater than the amplitude of the sensed current injected into the grid, and thus the switching rate of the voltage inversion stage is once again increased. However if the previous change decreased the measured ripple voltage (which senses the power drawn from the photovoltaic panel), then the template amplitude, and hence switching rate of the voltage inversion stage, is also decreased. In this way the control technique operates to control the output voltage inversion stage such that the photovoltaic panel is maintained at substantially its maximum output power point.

We have thus described a power conditioning unit with MPPT for a photovoltaic panel in which a power injection control block has a sense input coupled to an energy storage capacitor on a dc link and controls a dc-to-ac converter to control the injected mains power. The power injection control block tracks the maximum power point by measuring a signal on the dc link which depends on the power drawn from the dc power source, and thus there is no need to measure the dc voltage and current from the PV panel. In embodiments the signal is a ripple voltage level and the power injection control block controls an amplitude of an ac current output such that an amount of power transferred to the grid mains is dependent on an amplitude of a sinusoidal voltage component on the energy storage capacitor.

Preferred embodiments of the MPPT tracking system work with an inverter of the general type described above, but the techniques may also be used with other types of inverter, for example a 'four-switch' inverter as described in our U.S. Pat. No. 7,626,834, in particular if this is provided with a half or full bridge dc boost stage (with a transformer) at the front end.

Preferred embodiments of the invention are employed in inverters for photovoltaic panels, but in principle embodiments of the invention may alternatively be employed for MPPT for fuel cells. No doubt many other effective alternatives will occur to the skilled person. It will be understood that the invention is not limited to the described embodiments and encompasses modifications apparent to those skilled in the art lying within the scope of the claims appended hereto.

We claim:

1. A power conditioning unit with maximum power point tracking (MPPT), for delivering power from a dc power source to an ac mains power supply output, the power conditioning unit comprising:
    an input for receiving power from said dc power source;
    an output for delivering ac power to said ac mains power supply;
    an energy storage capacitor for storing energy from said dc power source for delivering to said ac mains power supply output;
    a dc-to-ac converter coupled to said output for converting energy stored in said energy storage capacitor to ac power for said ac mains power supply output; and
    a power injection control block having a sense input coupled to said energy storage capacitor and having an output coupled to said dc-to-ac converter, to control said dc-to-ac converter to control power injected into said ac mains power supply,
    wherein, in operation, a voltage on said energy storage capacitor has a sinusoidal voltage component at twice a frequency of said ac mains,
    wherein said power injection control block is configured for controlling an amplitude of an ac current provided to said ac mains power supply output such that an amount of power transferred to said ac mains power supply output is dependent on an amplitude of said sinusoidal voltage component on said energy storage capacitor, and
    wherein said power injection control block is configured to track a maximum power point of said dc power source by controlling said dc-to-ac converter.

2. The power conditioning unit of claim 1, wherein said power injection control block is configured to track a maximum power point of said dc power source without measuring a dc voltage or dc current provided from said dc power source.

3. The power conditioning unit of claim 1, wherein said power injection control block is configured to determine a power transferred from said dc source to said ac mains power supply using a squared value of said sinusoidal voltage component, and to control said dc-to-ac converter responsive to said determined power transferred.

4. The power conditioning unit of claim 1, wherein said power injection control block is galvanically isolated from said dc power source.

5. The power conditioning unit of claim 1, wherein said power injection control block is configured to multiply a voltage sensed from said energy storage capacitor by a sinusoidal template to generate a template signal, and to compare said template signal with a signal sensed from said output to control said dc-to-ac converter.

6. The power conditioning unit of claim 1 further comprises a dc voltage amplifier coupled between said input and said energy storage capacitor to increase a voltage from said dc power source by a substantially constant amplification factor.

7. The power conditioning unit as claimed in of claim 6 further comprises a voltage amplifier control block to drive said dc voltage amplifier with a substantially constant duty cycle pulse width modulation control signal, and to provide on-off control of a dc output from said dc voltage amplifier.

8. The power conditioning unit of claim 1, wherein an energy flow from said dc power source to said energy storage capacitor is substantially proportional to an amount of energy stored in said energy storage capacitor, wherein an amount of energy drawn from said energy storage capacitor and provided to said output is controlled by said power injection control block such that said amount of energy stored in said energy storage capacitor is dependent on said ac power delivered to said ac mains power supply, and wherein said power injection block is able to track said maximum power point by controlling said ac power delivered to said ac mains power supply.

9. The power conditioning unit of claim 1, wherein said power injection control block is configured to track said maximum power point by controlling said dc-to-ac converter to substantially maximize said amplitude of said sinusoidal voltage component.

* * * * *